United States Patent
Chukka et al.

(10) Patent No.: US 10,637,749 B2
(45) Date of Patent: Apr. 28, 2020

(54) REMOTE MACHINE MANAGEMENT

(75) Inventors: Ravikiran Chukka, Beaverton, OR (US); Gyan Prakash, Beaverton, OR (US); Rajesh Poornachandran, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 732 days.

(21) Appl. No.: 13/991,388

(22) PCT Filed: Dec. 22, 2011

(86) PCT No.: PCT/US2011/066848
§ 371 (c)(1),
(2), (4) Date: Sep. 27, 2013

(87) PCT Pub. No.: WO2013/095509
PCT Pub. Date: Jun. 27, 2013

(65) Prior Publication Data
US 2014/0325046 A1 Oct. 30, 2014

(51) Int. Cl.
*H04L 12/24* (2006.01)
*G06F 3/14* (2006.01)
(Continued)

(52) U.S. Cl.
CPC ........ *H04L 41/5054* (2013.01); *G06F 3/1454* (2013.01); *G06F 9/452* (2018.02);
(Continued)

(58) Field of Classification Search
USPC ................................................ 709/223, 225
See application file for complete search history.

(56) References Cited

U.S. PATENT DOCUMENTS

2007/0266234 A1* 11/2007 Inami ............... H04L 63/123
713/153
2008/0139195 A1* 6/2008 Marsyla ............ H04W 24/10
455/423
(Continued)

FOREIGN PATENT DOCUMENTS

JP 2007140901 A 6/2007
JP 2008097344 A 4/2008
(Continued)

OTHER PUBLICATIONS

"International Application Serial No. PCT/US2011/066848, International Search Report and Written Opinion dated Jun. 25, 2012", 3 pgs.
(Continued)

*Primary Examiner* — Hermon Asres
(74) *Attorney, Agent, or Firm* — Schwegman Lundberg & Woessner, P.A.

(57) ABSTRACT

Various systems and techniques for remote machine management are described. Simulated device input (SDI) may be received from a source machine at a device driver module of a target machine, the source machine is remote from the target machine. The SDI may correspond to a local target input device serviced by the device driver module. The SDI may be provided to a consumer of the device driver module. A representation of a local target machine graphical display may be transmitted to the source machine including a response to the provided SDI.

21 Claims, 4 Drawing Sheets

(51) Int. Cl.
 *H04L 29/08* (2006.01)
 *G06F 9/451* (2018.01)
(52) U.S. Cl.
 CPC .......... *H04L 41/145* (2013.01); *H04L 67/125* (2013.01); *G09G 2354/00* (2013.01); *G09G 2370/022* (2013.01); *H04L 67/025* (2013.01)

(56) References Cited

U.S. PATENT DOCUMENTS

| | | | |
|---|---|---|---|
| 2009/0284476 A1* | 11/2009 | Bull | G06F 9/452 345/173 |
| 2009/0327910 A1 | 12/2009 | Black et al. | |
| 2010/0261465 A1 | 10/2010 | Rhoads et al. | |
| 2010/0279652 A1* | 11/2010 | Sharp | G06F 9/4843 455/410 |
| 2011/0199389 A1 | 8/2011 | Lu et al. | |
| 2011/0319056 A1* | 12/2011 | Toy | H04L 9/3226 455/412.2 |
| 2012/0159245 A1* | 6/2012 | Brownlow | G06F 11/0712 714/23 |

FOREIGN PATENT DOCUMENTS

| | | |
|---|---|---|
| WO | WO-2007071372 A1 | 6/2007 |
| WO | WO-2013095509 A1 | 6/2013 |

OTHER PUBLICATIONS

"International Application Serial No. PCT/US2011/066848, Written Opinion dated Jun. 25, 2012", 6 pgs.

"European Application Serial No. 11878232.5, Extended European Search Report dated Jul. 22, 2015", 6 pgs.

"International Application Serial No. PCT/US2011/066848, International Preliminary Report on Patentability dated Jul. 3, 2014", 8 pgs.

"Japanese Application Serial No. 2014-547171, Office Action dated Mar. 24, 2015", 12 pgs.

* cited by examiner

REMOTE MACHINE MANAGEMENT

PRIORITY APPLICATION

This application is a U.S. National Stage Application under 35 U.S.C. 371 from International Application No. PCT/US2011/066848, filed Dec. 22, 2011, which is hereby incorporated by reference in its entirety.

BACKGROUND

Individuals may have machines (e.g., smart phones, tablets, other handheld computing devices, etc.) that are supported by an organization, such as their employer. These machines may have a variety of input devices, such as touch screens, accelerometers, and proximity detectors, among others. Generally, a machine has one or more device drivers to interface between the input device and input device consumers, such as an operating system, on the machine.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Organization support for an individual's machine may be eased via remote administration. Generally, administrators use desktop or laptop machines with a keyboard and a pointing device (e.g., a mouse, touchpad, etc.) as input devices. However, individual's machines, such as tablets, often include input devices, such as multi-point touch screens, accelerometers, proximity sensors (e.g., to disable the touch screen when a user's face is close to a phone when speaking), or light sensors that are not found on an administrator's desktop machine, for example. Some of these input devices, such as an accelerometer, are impractical to use, for example, on a desktop machine.

Providing a translation between input devices on the administrator's machine to device inputs for input devices on the individual's machine may allow the administrator to fully interact with the individual's machine. In an example, the translated device inputs may be transmitted to the device driver on the individual's machine, which provides device inputs for the target input device. In this way, consumers of the target device inputs (e.g., an operating system, other device drivers, etc.) are unaware that the inputs did not originate from the input device's hardware. By providing simulated device inputs in this way, administrators may interact with software and hardware components of the individual's machine in the same way the individual does. Thus, effective remote machine may be accomplished.

Additionally, an end-user themselves may wish to access the target machine remotely for a variety of reasons. In an example, the target machine may be damaged so as to prevent effective operation (e.g., the input screen is cracked or broken). The end-user may use the disclosed remote management to gain access to the target machine to, for example, data recovery. In an example, the end-user may simply wish to access a file stored on the target machine when the end-user is in a remote location.

Figure 1:
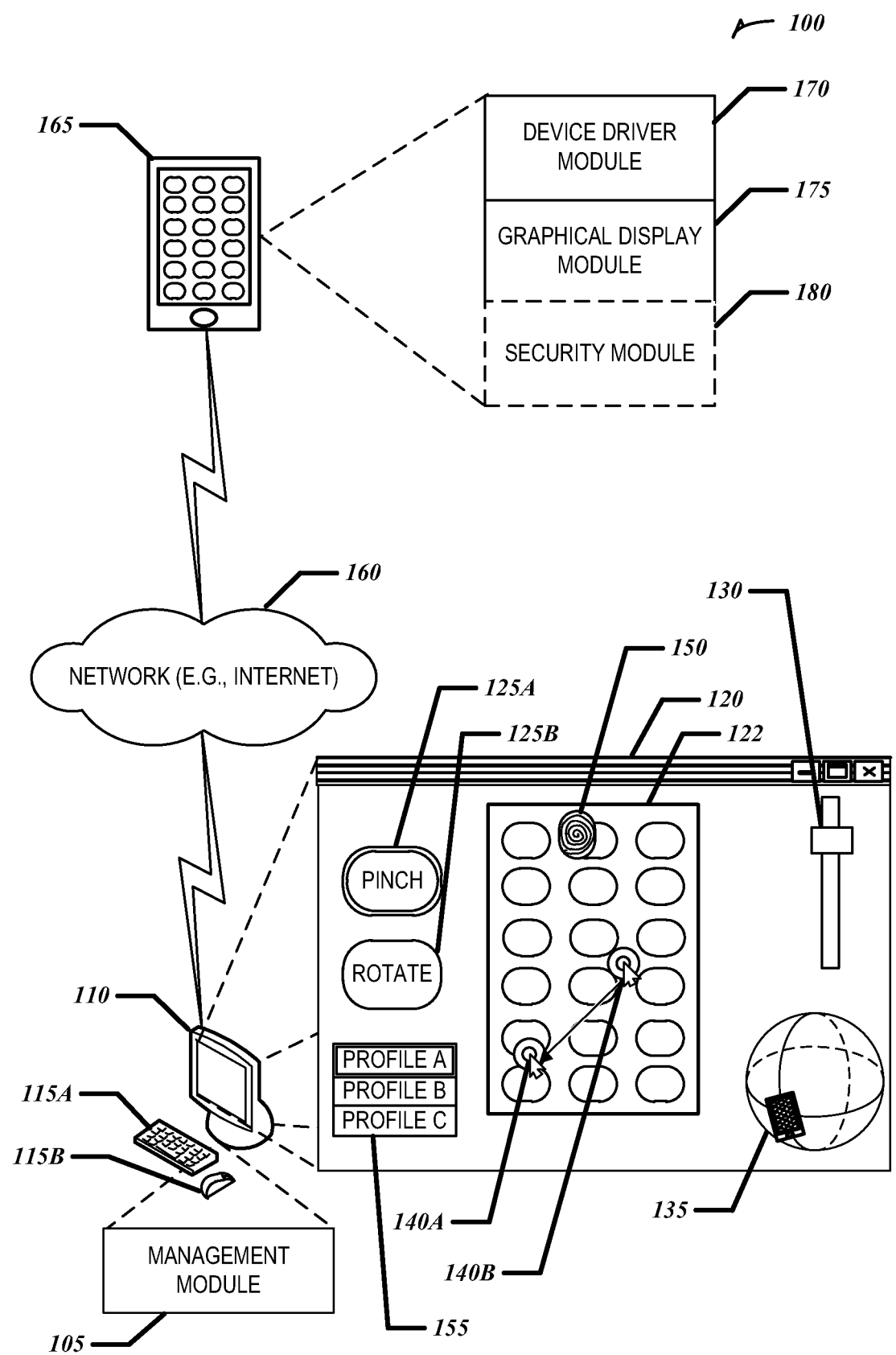
FIG. 1 is a schematic diagram illustrating an example of a system for remote machine management, according to an embodiment.

FIG. 1 is a schematic diagram illustrating an example of a system 100 for remote machine. The system 100 may include a source machine 110 and a target machine 165 connected via a network 160 (e.g., the Internet, or other wired or wireless connection). In an example, the source machine 110 may be a desktop or laptop machine including at least one source input device 115 (e.g., a keyboard 115A or a pointing device 115B). In an example, the target machine 165 may be a tablet, smartphone, personal digital assistant, or other handheld device including at least one target input device that does not have a version (e.g., analogue) on the source machine 110. As used herein, an input device (e.g., a source input device 115 or target input device) is a hardware device that physically interacts with a user (e.g., via manipulation, scanning, listening, etc.) and provides data to its host machine about this interaction. Therefore, devices such as network adapters are not input devices. As used herein, different versions of an input device are about the same as each other, such that they vary, if at all, in only minor ways (e.g., size (e.g., a portable laptop mouse and a regular desktop mouse), color, brand, etc.) Thus, two different brands of mice are both versions of a mouse input device but a multi-point touch screen is not a version of a touch pad (e.g., such as those found on laptop machines) even if the touch pad has multi-point capability.

The source machine 110 may include a management module 105. The management module 105 may be configured to present a graphical user interface (GUI) 120. The GUI 120 may include a representation 122 of the target machine's 165 local graphical display. For example, the representation 122 may be a reproduction of the display presented on the target machine's screen. In an example, the representation 122 may include a visual representation 150 of device input from the target input device. For example, if the target input device is a touch screen, an icon representing the target machine 165 user's finger may be placed on the representation 122. In this way, an administrator may observe the user interacting with the target machine 165 to facilitate the remote machine management. In an example, the target machine 165 may be configured to place the visual representation 150 on the representation 122 (e.g., using the graphical display module 175) prior to transmitting the representation 122 to the source machine 110. In an example, the target machine 165 may be configured to transmit target input device data (e.g., from the user's interaction with the target input device) to the source machine 110. In this example, the source machine may be configured (e.g., using the management module 105) to construct and present the visual representation 150.

The management module 105 may be configured to receive a selection of a target input device. For example, if the target machine 165 had a multi-point touch interface (e.g., screen), an accelerometer, and a proximity sensor, the administrator may select one of these target input devices, for example, via the GUI 120. In an example, the target input device may be selected via selection of an operation 125 of the target input device. For example, the administrator may selected the pinch operation 125A corresponding to the multi-touch interface. Thus, the multi-point touch interface is implicitly selected in this example. In another example, the accelerometer interface element 135 may be dragged (e.g., to simulate moving the target machine 165). In this example, the accelerometer would be selected when the accelerometer interface element 135 is manipulated. In another example, the proximity interface element 130 may be slid (e.g., to simulate an object moving closer or farther away from the target device's proximity sensor input device). Accordingly, the target input device may be implicitly selected, for example, by selection of an operation 125 that corresponds with the target input device. In an example, the operation 125 may include a plurality of components. These components are logical divisions of actions or circumstances that make up the operation 125. For example, if a scrolling operation is conducted on a multi-point touch screen target input device by placing two fingers on the screen and dragging (e.g., swiping) the fingers up or down, than the placement of each finger may be a component and the motion of each finger may be a component. In an example, the positions or motions of more than two fingers, a palm, or other discernible body part may comprise one or more components.

The management module 105 may be configured to receive source input device 115 data. For example, an administrator may use the mouse 115B to interact with the GUI 120 to select the multi-point touch interface's pinch operation 125A, click on a first location (e.g., to simulate a first finger touching the multi-point touch interface), move the mouse 115B, click on a second location (e.g., to simulate a second finger touching the multi-point touch interface), and drag the pointer from the second location 140B to the first location 140A. In an example, the keyboard 115A may be combined with the mouse 115B, to generate the source input device data. For example, holding the "F" key down while clicking may indicate that the location of the click should correspond to a finger in a multi-finger operation, such as the pinch operation 125A described above. In this way, an arbitrary number of simulated finger touches may be positioned on the representation 122. In an example, the keyboard 115A may be used alone. In an example, where the operation 125 includes a plurality of components, a first action and second action may be received from the source input device 115 and respectively correspond to a first component and a second component from the plurality of components. The pinch operation 125A described above is one such example, where the components include the position and motion of two fingers, and the corresponding actions include the first click position 140A and the second click (and drag) position 140B. In an example, a screen click (e.g., depressing a multi-point touchscreen) or other manipulations of physical input mechanisms (e.g., button) can comprise one or more components.

In an example, the management module 105 may be configured to load characteristics of the target machine 165, including, the available target input devices. In an example, the GUI 120 may include a profile GUI element 155 configured to receive selection of a target device profile containing the characteristics of the target machine 165. In an example, the characteristics may be queried from the target machine 165. In an example, the management module may be configured to present user interface (UI) elements (e.g., elements 125, 130, and 135 of FIG. 1) in the GUI 120 based on the characteristics of the target machine 165.

The management module 105 may be configured to create simulated device input (SDI) for the target input device based on the source input device 115 and the selection of the target input device. SDI represents device input to the target machine 165 (e.g., data generated from an accelerometer when the target machine 165 is shaken) created without the benefit of the input device itself. For example, using the pinch operation 125A described above, the management module 105 may simulate the pinching motion of two or more fingers on the target machine 165 when the second location 140B click is dragged. In an example, the SDI is in a universal form, where the universal form is not dependent on its consumer. For example, the SDI is created into the same form regardless of the specific target machine 165 or device driver module 170. In an example, the universal form of SDI varies between target input device types. For example, the universal form of a multi-point touch interface may be different from the universal form of a proximity sensor. However, the universal form of SDI between two different proximity sensors would be the same.

In an example, the SDI is in a specific form that is specific to the device driver module 170 servicing the selected target input device. For example, if a proximity sensor on the target machine 165 produces a data stream, based on a stimulus, to the target machine 165, the specific SDI approximates the data stream. In an example, the previously described characteristics of the target machine 165 may be used to translate the source input from a source input device 115 into the specific form of SDI.

In an example, the management module 105 may be configured to transmit (e.g., via a wired or wireless network interface) the SDI to the target machine 165. In an example, the management module 105 is configured to communicate directly with the device driver module 170 corresponding to the selected target input device. In an example, the management module 105 may authenticate to the target machine 165. In an example, the authentication may occur once, when communication is established to the target machine, periodically during a communications session, or each time SDI is transmitted to the target machine 165.

Moving from the source machine 110 to the target machine 165, the target machine 165 may include a device driver module 170. The device driver module 170 is associated with one or more specific target input devices and provides an interface between the hardware and firmware of those devices and the target machine 165. For example, if the target input device is a light sensor, the device driver module 170 corresponding to the light sensor interprets the signals generated from the light sensor into a format intelligible by one or more consumers (e.g., as described below) of the target machine 165. In an example, the device driver module 170 may be configured to receive SDI from the source machine 110 (e.g., from the management module 105).

The device driver module 170 may be configured to provide the SDI to a consumer of the device driver module 170. As used herein, a consumer of the device driver module 170 is any entity on the target machine 165 that receives input device data from the device driver module 170. Example consumers of the device driver module 170 may include the target machine's operating system, and other software and hardware components. When using direct memory access (DMA), for example, the graphical display module 175 may directly (e.g., without interacting with the operating system) receive input (e.g., shaking) from the accelerometer indicating that the display should be powered on. In this example, the graphical display module 175 is a consumer of the device driver module 170 for the accelerometer target input device. In an example, when the SDI is in the specific form, the device driver module 170 may be configured to pass the SDI to its consumers without modification. In an example, when the SDI is in the universal form, the device driver module 170 may be configured to convert the universal form to device input specific to the device driver module 170. For example, the universal form of the SDI is similar to a separate piece of hardware feeding raw data to the device driver module 170. The device driver module 170 would then take that raw data and convert it to its specific form prior to passing the data to a consumer of the device driver module 170 in much the same way the device driver module 170 converts raw data from the local target input device. As noted above, accepting the SDI at the device driver module 170 provides a realistic interaction with the target machine's components because those components are unaware that the device input did not originate from the target input device.

In an example, the target machine 165 may authenticate the source machine 110. In an example, the authentication may occur when communication is first established between the source machine 110 and the target machine 165, periodically thereafter, or when SDI is received. In an example, the authentication may include identifying a set of permitted consumers of one or more device driver modules. In this example, any given consumer must be in the set of permitted consumers to receive the SDI (e.g., the SDI is blocked to a consumer that is not in the set of permitted consumers). In this way, security policies may be created in the target machine 165 to limit the resources that an administrator may access. In an example, the authentication may include a username and password combination. In an example, the authentication may include using an encryption key. In an example, the authentication may include using a proximity based authentication procedure such as near field communications (NFC) (e.g., very short range radio communications or near field induction based communications), Bluetooth, a local area network (LAN), or other mechanisms providing security via physical access to the target machine 165 (e.g, directly wired connections).

In an example, the target machine 165 may optionally include a security module 180. In an example, the security module 180 is based on the hardware platform of the target machine 165 and outside the control of the target machine's 165 local operating system. Such security modules 180 may prevent viruses, worms, or other malicious software from comprising the target machine's 165 security. In an example, the previously described authentication of the source machine 110 by the target machine 165 may be performed, in part, by the security module 180. In an example, the entire authentication may be performed by the security module 180.

The target machine may also include a graphical display module 175. In an example, the graphical display module 175 may be configured to transmit the representation 122 of the target machine's 165 local graphical display to the source machine 110. In an example, the transmission of the representation 122 may occur periodically (e.g., every 100 milliseconds). In an example, the transmission may occur in response to a change in the graphical display, such as when the rendering buffer is updated. In an example, the transmission may include a response to the received SDI. For example, after SDI is received and distributed to consumers of the device driver module 170, the resultant graphical display (even if no change has occurred) may be transmitted to the source machine 110 (e.g., the management module 105) as the representation 122. In an example, the representation may include an indicator from one or more target input devices. The indicator may be configured to allow the management module 105, for example, to create the visual representation 150 of device input from a target input device.

One or more components described above may be used in any combination to perform the operations of methods 200 and 300. However, any other suitable components may be added or substituted with the previously described components to perform the following operations.

Figure 2:
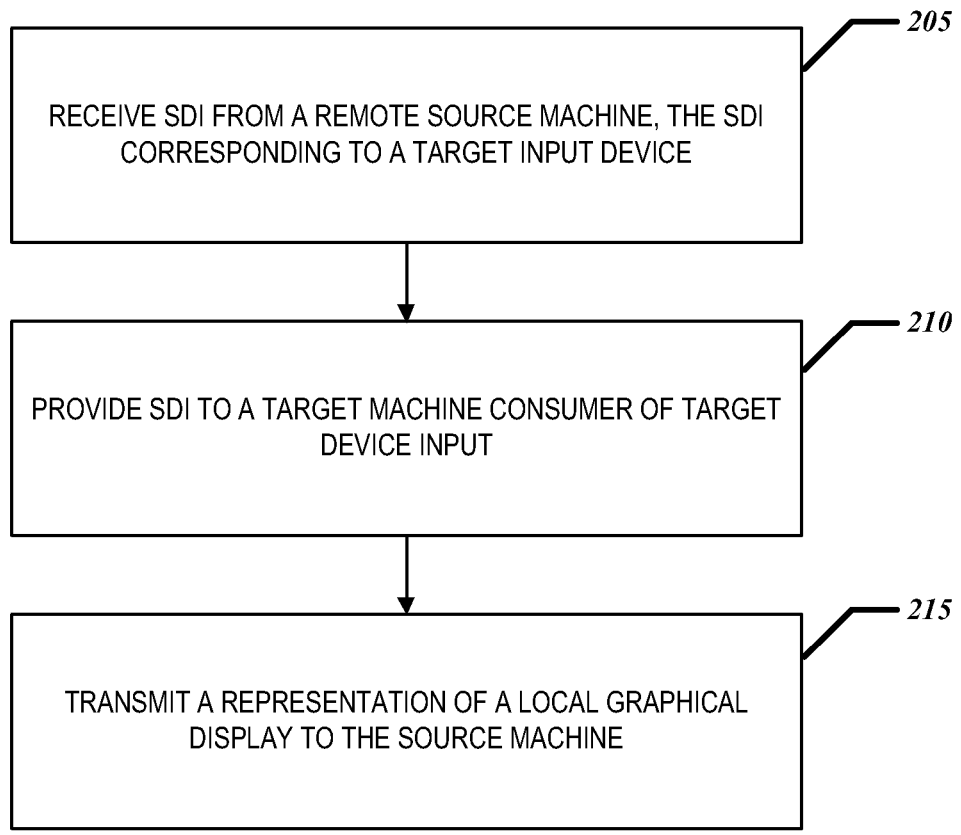
FIG. 2 is a flowchart illustrating an example of a target-side method for remote machine management, according to an embodiment.

FIG. 2 is a flowchart illustrating an example of a target-side method 200 for remote machine management.

At operation 205, SDI may be received, for example, at a device driver module 170 of the target machine 165, from the source machine 110. The SDI may correspond to an input device local to the target machine 165 serviced by the device driver module 170. The source machine 110 is remote (e.g., across the network 160, etc.) from the target machine 165. In an example, the target input device may be a multi-point touch interface. In an example, the target input device may be an accelerometer. In an example, the source machine 110 does not have a version of the target input device.

In an example, operation 205 may include authenticating the source machine 110. In an example, the authenticating may include authenticating using a security module 180 local to the target machine 165. The security module 180 may be outside of the target machine's 165 local operating system's control, such as described above with respect to FIG. 1.

At operation 210, the SDI may be provided to a consumer of the of the device driver module 170. The consumer may be any consumer of the target input device's data, for example, as described above with respect to FIG. 1. In an example, the authenticating of the source machine 110 of operation 205 may include identifying a set of permitted consumers. The consumer being in the set of permitted consumers. In an example, the SDI may be in a universal form (such as described with respect to FIG. 1). In this example, providing the SDI to the consumer may include converting the universal form to device input specific to the device driver module 170. In an example, the SDI is in a specific form (e.g., specific to the device driver module 170). In this example, providing the SDI to the consumer may include passing the SDI to the consumer without modification.

At operation 215, a representation 122 of the target machine's 165 local graphical display may be transmitted to the source machine 110. The representation may include a response to the SDI provided by the device driver module 170.

Figure 3:
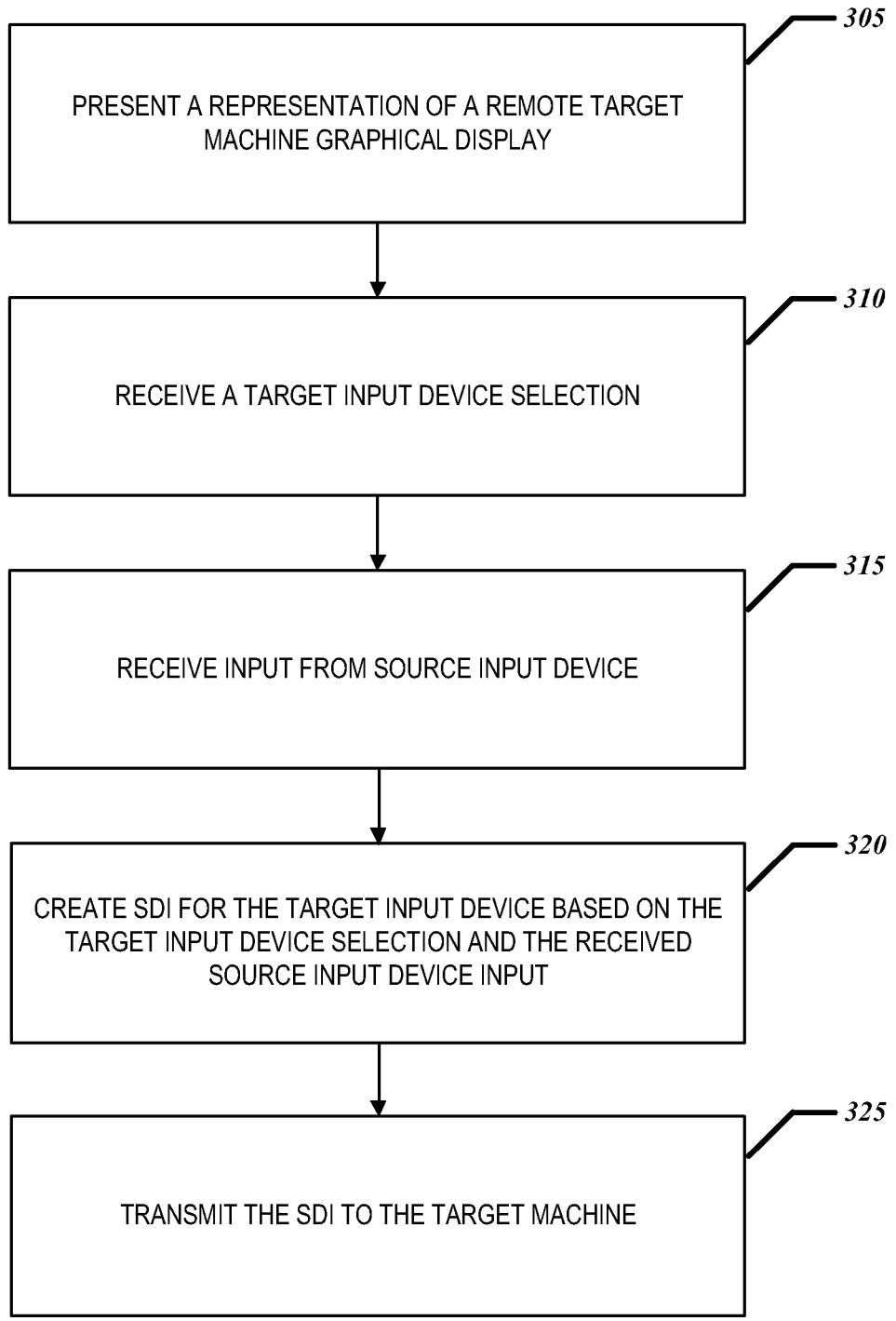
FIG. 3 is a flowchart illustrating an example of a source-side method for remote machine management, according to an embodiment.

FIG. 3 is a flowchart illustrating an example of a source-side method 300 for remote machine management.

At operation 305, the representation 122 of the target machine's 165 local graphical display may be presented in a GUI 120 on the source machine 110. In an example, a security handshake, for example, using the security module 180, may occur prior to the presentation of the representation 122 in the GUI 120. The target machine 110 may be remote (e.g., across the network 160) from the GUI 120. In an example, the representation of the local graphical display may include a visual representation (e.g., 150) of device input from the target input device.

At operation 310, a selection of the target input device may be received from a user (e.g., of the source machine 110). The target input device being local to the target machine 165 and absent from the source machine 110. In an example, selection of the target input device may include receiving a selection of an operation of the target input device. In an example, the operation may include a plurality of components (e.g., the position and motion of two fingers pinching a multi-point touch interface).

At operation 315, input from the source input device 115 may be received. In an example, given an operation of operation 310 with a plurality of components, receiving input from the source input device may include receiving a first action and a second action respectively corresponding to a first component and a second component from the plurality of components. For example, using each of two fingers performing a pinching action as the first and second components, a first mouse click in a first location (e.g., 140A) may be the first action and a second mouse click in a second location (e.g., 140B) may be the second action.

At operation 320, SDI may be created for the target input device based on the input received at operation 315 and the target input device selected at operation 310. In an example, creating the SDI may include generating a universal form of SDI, such as described with respect to FIG. 1. In an example, creating the SDI may include determining a specific form corresponding to the device driver module 170 servicing the target input device. For example, a profile of the target device 165 may be selected from a profile GUI element 155, where the profile includes the specific form. In this example, the input from the source input device 115 may be translated, for example based on the profile, into the specific form.

At operation 325, the SDI may be transmitted (e.g., across the network 160) to the target machine 165. In an example, transmitting the SDI may include authenticating to a security module 180 of the target machine 165. In an example, the security module is outside the control of the target machine's 165 local operating system.

Figure 4:
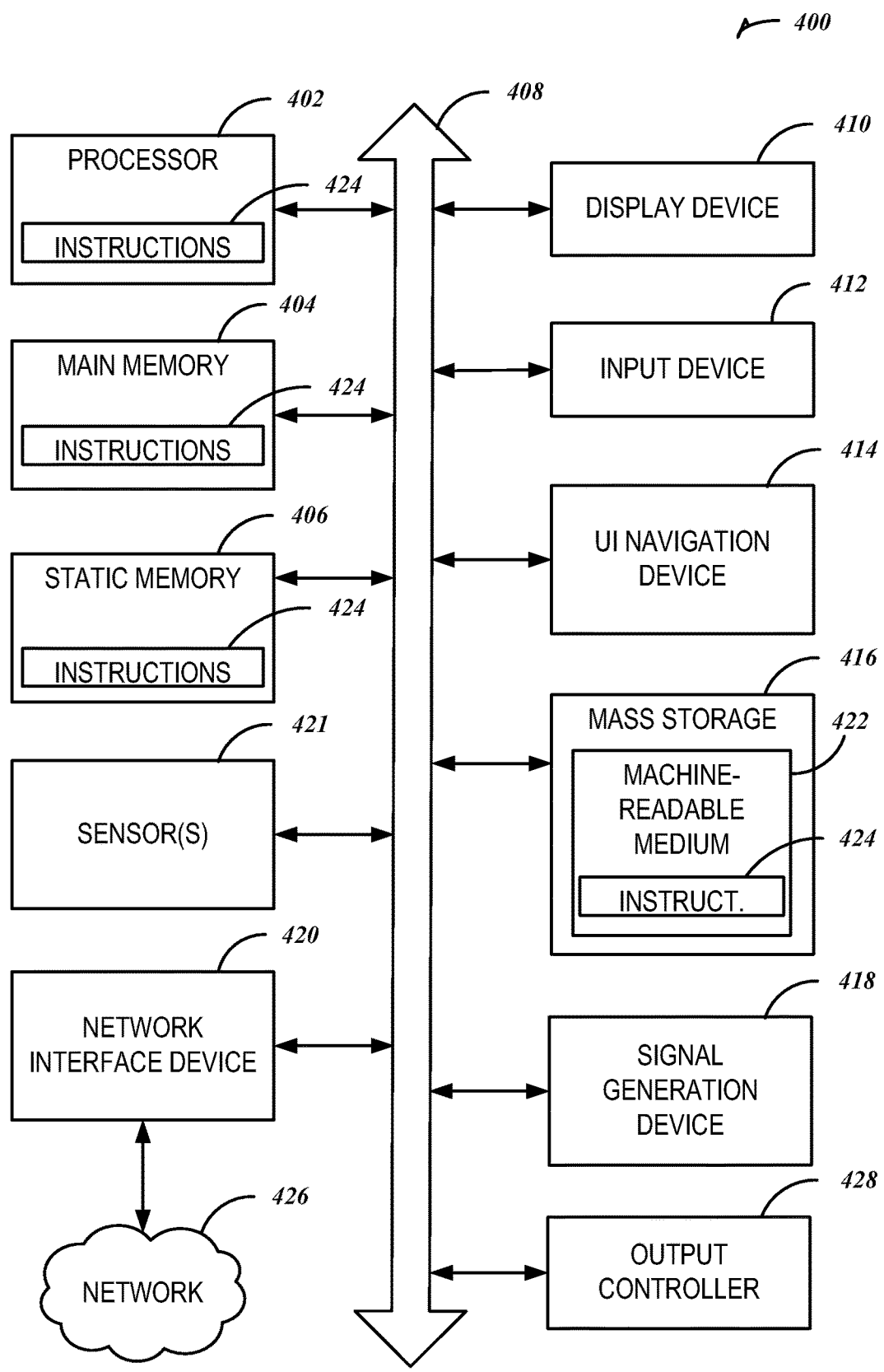
FIG. 4 is a block diagram illustrating an example of a machine upon which one or more embodiments may be implemented.

FIG. 4 is a block diagram illustrating an example of a machine 400 upon which any one or more of the techniques (e.g., methodologies) discussed herein may perform. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside (1) on a non-transitory machine-readable medium or (2) in a transmission signal. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via a link 408 (e.g., an interlink, bus, etc.). The machine 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The machine 400 may include an output controller 428, such as a serial (e.g., universal serial bus (USB), parallel, or other wired or wireless (e.g., infrared (IR)) connection to communicate or control one or more peripheral devices (e.g., a printer, card reader, etc.).

The storage device 416 may include a machine-readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine-readable medium 422 is illustrated as a single medium, the term "machine readable medium" may include a single medium or multiple media (e.g., a centralized or distributed database, and/or associated caches and servers) that configured to store the one or more instructions 424.

The term "machine-readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine-readable medium examples may include solid-state memories, and optical and magnetic media. In an example, a massed machine-readable medium comprises a machine-readable medium with a plurality of particles having resting mass. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 400, and includes digital or analog communications signals or other intangible medium to facilitate communication of such software.

ADDITIONAL NOTES & EXAMPLES

Example 1 may include subject matter (such as a method, means for performing acts, or machine-readable medium including instructions that, when performed by a machine cause the machine to performs acts) comprising receiving, at a device driver module of a target machine, simulated device input (SDI) from a source machine, the SDI corresponding to a local target input device serviced by the device driver module, the source machine being remote from the target machine, providing the SDI to a consumer of the device driver module, transmitting a representation of a local target machine graphical display to the source machine including a response to the provided SDI.

In Example 2, the subject matter of Example 1 may optionally include, wherein the SDI is in a universal form, and wherein providing the SDI to the consumer includes converting the universal form to device input specific to the device driver module.

In Example 3, the subject matter of Example 1 may optionally include, wherein the SDI is in a specific form, and wherein providing the SDI to the consumer includes passing the SDI to the consumer without modification.

In Example 4, the subject matter of one or any of Examples 1-3 may optionally include, wherein the source machine does not have a version of the target input device.

In Example 5, the subject matter of one or any of Examples 1-3 may optionally include, wherein receiving the SDI from the source machine includes authenticating the remote machine.

In Example 6, the subject matter of Example 5 may optionally include, wherein authenticating the source machine includes authenticating using a local security module outside of a local operating system's control.

In Example 7, the subject matter of one or any of Examples 5-6 may optionally include, wherein authenticating the source machine includes identifying a set of permitted consumers; and wherein the consumer is in the set of permitted consumers.

In Example 8, the subject matter of one or any of Examples 1-7 may optionally include, wherein the target input device is a multi-point touch interface.

In Example 9, the subject matter of one or any of Examples 1-8 may optionally include, wherein the target input device is an accelerometer.

In Example 10, the subject matter of one or any of Example 1-9 may optionally include at least one machine readable medium comprising instructions that when executed by a computing device, cause the device to perform a method of any of Examples 1-9.

Example 11 may include, or may optionally be combined with the subject matter of one or any combination of Examples 1-10 to include, subject matter (such as an apparatus, device, machine, source machine, or system) comprising a management module configured to create simulated device input (SDI) for a target input device based on a source input device and a selection of the target input device received from a user of the source machine, transmit the SDI to a target machine remote from the source machine, and present, to the user, a representation of a graphical display of the target machine. Example 11 may also include and a graphical display to display a representation of the graphical display of the target machine.

In Example 12, the subject matter of Example 11 can optionally comprise a profile module configured to translate source input from the source input device into a specific form of device input corresponding to the target input device.

In Example 13, the subject matter of one or any of Examples 11-12 may optionally include, wherein the source input device is a mouse and the target input device is a multi-point touch interface.

In Example 14, the subject matter of one or any of Examples 11-13 may optionally include, wherein the source input device is a mouse and the target input device is a proximity sensor.

Example 15 may include, or may optionally be combined with the subject matter of one or any combination of Examples 1-14 to include, subject matter (such as an apparatus, device, machine, target machine, or system) comprising a device driver module on the target machine, the device driver module configured to receive simulated device input from a source machine, the SDI based on a source input device and a selection of the target input device received from a user of the source machine, and provide the SDI to a consumer of the device driver module, the consumer being local to the target machine. Example 15 may also comprise a graphical display module on the target machine, the graphical display module configured to transmit the representation of the graphical display to the source machine.

In Example 16, the subject matter of Example 15 can optionally include, wherein the SDI is in a universal form, and wherein to provide the SDI to the consumer includes the device driver module configured to convert the universal form to device input specific to the device driver module.

In Example 17, the subject matter of one or any of Examples 15-16 may optionally include, wherein the SDI is in a specific form, and wherein to provide the SDI to the consumer the device driver module is configured to passing the SDI to the consumer without modification.

In Example 18, the subject matter of one or any of Examples 15-17 may optionally include, wherein the source machine does not have a version of the target input device.

In Example 19, the subject matter of one or any of Examples 15-18 may optionally include, wherein to receive the SDI from the source machine the device driver module is configured to authenticate the source machine.

In Example 20, the subject matter of Example 19 may optionally include, wherein to authenticate the source machine the device driver module is configured to use a local security module outside an operating system of the target's control.

In Example 21 the subject matter of one or any of Examples 19-20 may optionally include, wherein to authenticate the source machine the local security module is configured to identify a set of permitted consumers; and wherein the consumer is in the set of permitted consumers.

In Example 22, the subject matter of one or any of Examples 15-21 may optionally include, wherein the target input device is a multi-point touch interface.

In Example 23, the subject matter of one or any of Examples 15-22 may optionally include, wherein the target input device is an accelerometer.

Example 24 may include, or may optionally be combined with the subject matter of one or any combination of Examples 1-23 to include, subject matter (such as an apparatus, device, machine, or system) comprising a management module on a source machine, the management module configured to create simulated device input (SDI) for a target input device based on a source input device and a selection of the target input device received from a user, transmit the SDI to a target machine remote from the source machine, and present, to the user, a representation of a graphical display of the target machine. Example 24 may also comprise a device driver module on the target machine, the device driver module configured to receive the SDI, and provide the SDI to a consumer of the device driver module, the consumer being local to the target machine. Example 24 may also comprise a graphical display module on the target machine, the graphical display module configured to transmit the representation of the graphical display to the source machine.

In Example 25, the subject matter of Example 24 can optionally comprise a profile module configured to translate source input from the source input device into a specific form of device input corresponding to the target input device.

In Example 26, the subject matter of one or any of Examples 24-25 may optionally include, wherein the source input device is a mouse and the target input device is a multi-point touch interface.

In Example 27, the subject matter of one or any of Examples 24-26 may optionally include, wherein the source input device is a mouse and the target input device is a proximity sensor.

The above detailed description includes references to the accompanying drawings, which form a part of the detailed description. The drawings show, by way of illustration, specific embodiments which may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the claimed subject matter be determined with reference to the appended claims, along with the full scope of equivalents to which such claims are entitled.

What is claimed is:

1. A non-transitory machine readable medium including instructions that, when executed by a machine, cause the machine to perform operations comprising:
   receiving, at a device driver module of a target machine, simulated device input, herein referred to as SDI, from a source machine, the SDI in a form specific to a local target input device serviced by the device driver module, the source machine being remote from the target machine;

providing the SDI, without modification, to a consumer of the device driver module; and transmitting a representation of a graphical display of the target machine's to a graphical user interface (GUI) of the source machine including a response to the provided SDI, the GUI providing a representation of device output on the target machine and also providing an interactive input mechanism for devices of the target machine.

2. The machine readable medium of claim 1, wherein the source machine does not have a version of the target input device.

3. The machine readable medium of claim 1, wherein receiving the SDI from the source machine includes authenticating the source machine.

4. The machine readable medium of claim 3, wherein authenticating the source machine includes authenticating the source machine using a local security module outside of the target machine's operating system's control.

5. The machine readable medium of claim 1, wherein the target input device is a multi-point touch interface.

6. The machine readable medium of claim 1, wherein the target input device is an accelerometer.

7. A source machine for remote device management, the source machine comprising:
 a management module to:
  create pass-through simulated device input for a target input device based on a source input device, a selection of the target input device received from a user of the source machine, and a local device driver for the target input device;
  transmit the pass-through simulated device input to a device driver module servicing the target input device on a target machine remote from the source machine; and
  present, to the user, a representation of a graphical display of the target machine; and
 a graphical display to display a graphical user interface (GUI) including a representation of the graphical display of the target machine, the GUI providing a representation of device output on the target machine and also providing an interactive input mechanism for devices of the target machine.

8. The source machine of claim 7, comprising a profile module to translate source input from the source input device into the pass-through simulated device input using the local device driver.

9. The source machine of claim 7, wherein the source input device is a mouse and the target input device is a multi-point touch interface.

10. The source machine of claim 7, wherein the source input device is a mouse and the target input device is a proximity sensor.

11. A target machine for remote device management, the target machine comprising:
 a device driver module on the target machine, the device driver module to:
  service a target device for the target machine; and
  receive simulated device input, herein referred to as SDI, from a source machine, the SDI based on a source input device and a selection of the target input device received from a user of the source machine; and
  provide the SDI, without modification, to a consumer of the device driver module, the consumer being local to the target machine; and
 a graphical display module on the target machine, the graphical display module to transmit the representation of the graphical display to a graphical user interface (GUI) on the source machine, the GUI providing a representation of device output on the target machine and also providing an interactive input mechanism for devices of the target machine.

12. The target machine of claim 11, wherein the source machine does not have a version of the target input device.

13. The target machine of claim 11, wherein to receive the SDI from the source machine the device driver module is to authenticate the source machine.

14. The target machine of claim 13, wherein to authenticate the source machine the device driver module is to use a local security module outside an operating system of the target's control.

15. The target machine of claim 13, wherein to authenticate the source machine the local security module is to identify a set of permitted consumers; and wherein the consumer is in the set of permitted consumers.

16. The target machine of claim 11, wherein the target input device is a multi-point touch interface.

17. The target machine of claim 11, wherein the target input device is an accelerometer.

18. A system for remote device management, the system comprising:
 a management module on a source machine, the management module to:
  create pass-through simulated device input for a target input device based on a source input device, a selection of the target input device received from a user of the source machine, and a local device driver for the target input device;
  transmit the pass-through simulated device input to a target machine remote from the source machine; and
  present, to the user, a representation of a graphical display of the target machine;
 a device driver module on the target machine, the device driver module to:
  service the target input device for the target machine;
  receive the pass-through simulated device input; and
  provide the pass-through simulated device input, without modification, to a consumer of the device driver module, the consumer being local to the target machine; and
 a graphical display module on the target machine, the graphical display module to transmit the representation of the graphical display to a graphical user interface (GUI) on the source machine, the GUI providing a representation of device output on the target machine and also providing an interactive input mechanism for devices of the target machine.

19. The system of claim 18, comprising a profile module to translate source input from the source input device into the pass-through simulated device input using the local device driver.

20. The system of claim 18, wherein the source input device is a mouse and the target input device is a multi-point touch interface.

21. The system of claim 18, wherein the source input device is a mouse and the target input device is a proximity sensor.

* * * * *